(12) United States Patent
Zimmermann et al.

(10) Patent No.: US 11,065,744 B2
(45) Date of Patent: Jul. 20, 2021

(54) TOOL BIT HOLDER

(71) Applicant: MILWAUKEE ELECTRIC TOOL CORPORATION, Brookfield, WI (US)

(72) Inventors: Michael J. Zimmermann, New Berlin, WI (US); Xian Wei Xu, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/517,110

(22) Filed: Jul. 19, 2019

(65) Prior Publication Data

US 2020/0023502 A1   Jan. 23, 2020

(30) Foreign Application Priority Data

Jul. 20, 2018   (CN) .......................... 201810804116.9

(51) Int. Cl.
  *B23B 31/107*   (2006.01)
  *B25B 23/00*   (2006.01)
  *B23B 35/00*   (2006.01)
(52) U.S. Cl.
  CPC ...... *B25B 23/0035* (2013.01); *B23B 31/1071* (2013.01); *B23B 35/00* (2013.01); *B23B 2231/04* (2013.01); *B23B 2260/10* (2013.01)
(58) Field of Classification Search
  CPC ................ B25B 23/0035; B25B 23/12; Y10T 279/17752; B23B 31/1071; B23B 2260/10; B23B 31/22
  USPC ............................................ 279/82, 75, 905
  See application file for complete search history.

(56) References Cited

U.S. PATENT DOCUMENTS

| 3,658,351 A | 4/1972 | Benjamin et al. |
| 3,720,417 A | 3/1973 | Smith |
| 3,726,533 A | 4/1973 | Lafferty |
| 3,788,658 A | 1/1974 | Benjamin et al. |
| 4,502,824 A * | 3/1985 | Dohse ...................... B23Q 3/12 173/13 |
| 4,692,073 A | 9/1987 | Martindell |
| 4,753,142 A | 6/1988 | Hornung |
| 4,850,758 A | 7/1989 | Morgan |
| 4,900,202 A | 2/1990 | Wienhold |

(Continued)

FOREIGN PATENT DOCUMENTS

| CN | 2523565 Y | 12/2002 |
| CN | 101450480 B | 6/2009 |

(Continued)

*Primary Examiner* — Eric A. Gates
*Assistant Examiner* — Paul M Janeski
(74) *Attorney, Agent, or Firm* — Michael Best & Friedrich LLP

(57) ABSTRACT

A tool bit holder includes an inner sleeve in which a longitudinal bore is defined in which a tool bit is receivable and a detent is engageable with the tool bit for locking the tool bit within the longitudinal bore. An outer sleeve surrounds the inner sleeve and is movable relative to the inner sleeve between a locking position, in which the detent is engaged with the tool bit for locking the tool bit within the longitudinal bore, and a release position, in which the detent may be disengaged from the tool bit to permit removal of the tool bit from the longitudinal bore. A spring is positioned between the inner sleeve and the outer sleeve. The spring biases the outer sleeve toward the locking position.

21 Claims, 5 Drawing Sheets

(56) References Cited

U.S. PATENT DOCUMENTS

| | | |
|---|---|---|
| 4,946,179 A | 8/1990 | De Bastiani et al. |
| 5,013,194 A | 5/1991 | Wienhold |
| 5,188,378 A | 2/1993 | Erlenkeuser |
| 5,398,946 A | 3/1995 | Quiring |
| 5,417,527 A | 5/1995 | Wienhold |
| 5,464,229 A | 11/1995 | Salpaka |
| 5,470,180 A | 11/1995 | Jore |
| 5,678,961 A | 10/1997 | Fleege et al. |
| 5,779,404 A | 11/1998 | Jore |
| 5,954,463 A | 11/1999 | Jore |
| 5,996,452 A | 12/1999 | Chiang |
| 6,053,675 A | 4/2000 | Holland et al. |
| 6,176,654 B1 | 1/2001 | Jore |
| 6,199,872 B1 | 3/2001 | Hasan |
| 6,302,408 B1 | 10/2001 | Zierpka |
| 6,302,409 B1 | 10/2001 | Gutsche |
| 6,325,393 B1 | 12/2001 | Chen et al. |
| 6,457,916 B2 | 10/2002 | Wienhold |
| 6,488,452 B1 | 12/2002 | Hoskins et al. |
| 6,511,268 B1 | 1/2003 | Vasudeva et al. |
| 6,520,509 B1 | 2/2003 | Vasudeva et al. |
| 6,561,523 B1 | 5/2003 | Wienhold |
| 6,623,220 B2 | 9/2003 | Nuss et al. |
| 6,637,755 B2 | 10/2003 | Chen et al. |
| 6,695,321 B2 | 2/2004 | Bedi et al. |
| 6,722,667 B2 | 4/2004 | Clanton |
| 6,739,226 B2 | 5/2004 | Beauchamp |
| 6,761,095 B2 | 7/2004 | Beauchamp |
| 6,863,280 B2 | 3/2005 | Chiu |
| 6,874,791 B2 | 4/2005 | Chen et al. |
| 6,929,266 B2 | 8/2005 | Peters et al. |
| 7,063,332 B2 | 6/2006 | Muller |
| 7,073,417 B2 | 7/2006 | Beauchamp |
| 7,086,813 B1 | 8/2006 | Boyle et al. |
| 7,121,774 B2 | 10/2006 | Hirt et al. |
| 7,195,247 B2 | 3/2007 | Shu |
| 7,306,396 B1 | 12/2007 | Chen |
| 7,354,230 B2 | 4/2008 | Bauman |
| 7,374,377 B2 | 5/2008 | Bauman |
| 7,435,042 B2 | 10/2008 | White et al. |
| 7,448,302 B2 | 11/2008 | Huang |
| 7,469,909 B2 | 12/2008 | Strauch et al. |
| 7,654,779 B2 | 2/2010 | Sasaki et al. |
| 7,891,275 B2 | 2/2011 | Huang |
| 7,896,355 B2 | 3/2011 | Wienhold |
| 8,132,990 B2 | 3/2012 | Bauman |
| 8,292,304 B2 | 10/2012 | Wienhold |
| 8,308,168 B2 | 11/2012 | Nash |
| 8,550,471 B2 | 10/2013 | Huang |
| 8,636,287 B2 | 1/2014 | Wienhold |
| 9,089,901 B2 | 7/2015 | White et al. |
| 9,381,627 B2 | 7/2016 | Chen |
| 9,561,581 B2 | 2/2017 | Chen et al. |
| 2004/0056435 A1 | 3/2004 | Bedi et al. |
| 2006/0097464 A1* | 5/2006 | Strauch ............... B25B 23/0035 279/75 |
| 2006/0145431 A1 | 7/2006 | Chang |
| 2009/0008886 A1 | 1/2009 | Shu |
| 2010/0207335 A1 | 8/2010 | Lin |
| 2011/0023666 A1 | 2/2011 | Hsu |
| 2011/0049816 A1 | 3/2011 | Hsu |
| 2013/0214496 A1 | 8/2013 | Lin |
| 2016/0311091 A1 | 10/2016 | Wang |
| 2017/0282257 A1 | 10/2017 | Wang |
| 2017/0348832 A1 | 12/2017 | Yang |

FOREIGN PATENT DOCUMENTS

| | | |
|---|---|---|
| CN | 101722490 A | 6/2010 |
| CN | 104802119 A | 7/2015 |
| CN | 107756312 A | 3/2018 |
| DE | 2934428 A1 | 3/1981 |
| DE | 4242650 A1 | 6/1994 |
| DE | 20211170 U1 | 10/2002 |
| DE | 10219418 B4 | 11/2003 |
| DE | 202006018218 U1 | 2/2007 |
| DE | 202007004324 U1 | 7/2007 |
| DE | 202007009353 U1 | 9/2007 |
| DE | 202007015007 U1 | 3/2008 |
| DE | 202008006820 U1 | 10/2008 |
| DE | 202009001905 U1 | 7/2009 |
| DE | 102010008037 A1 | 9/2010 |
| DE | 202011110192 U1 | 2/2013 |
| DE | 202012105081 U1 | 3/2013 |
| DE | 102011054201 A1 | 4/2013 |
| DE | 102011085420 A1 | 5/2013 |
| DE | 202015102704 U1 | 6/2015 |
| DE | 202016101842 U1 | 4/2016 |
| DE | 202017103010 | 6/2017 |
| DE | 102016106594 B3 | 7/2017 |
| EP | 2067577 A1 | 6/2009 |
| EP | 3228408 A1 | 10/2017 |
| WO | 9532830 A1 | 12/1995 |

* cited by examiner

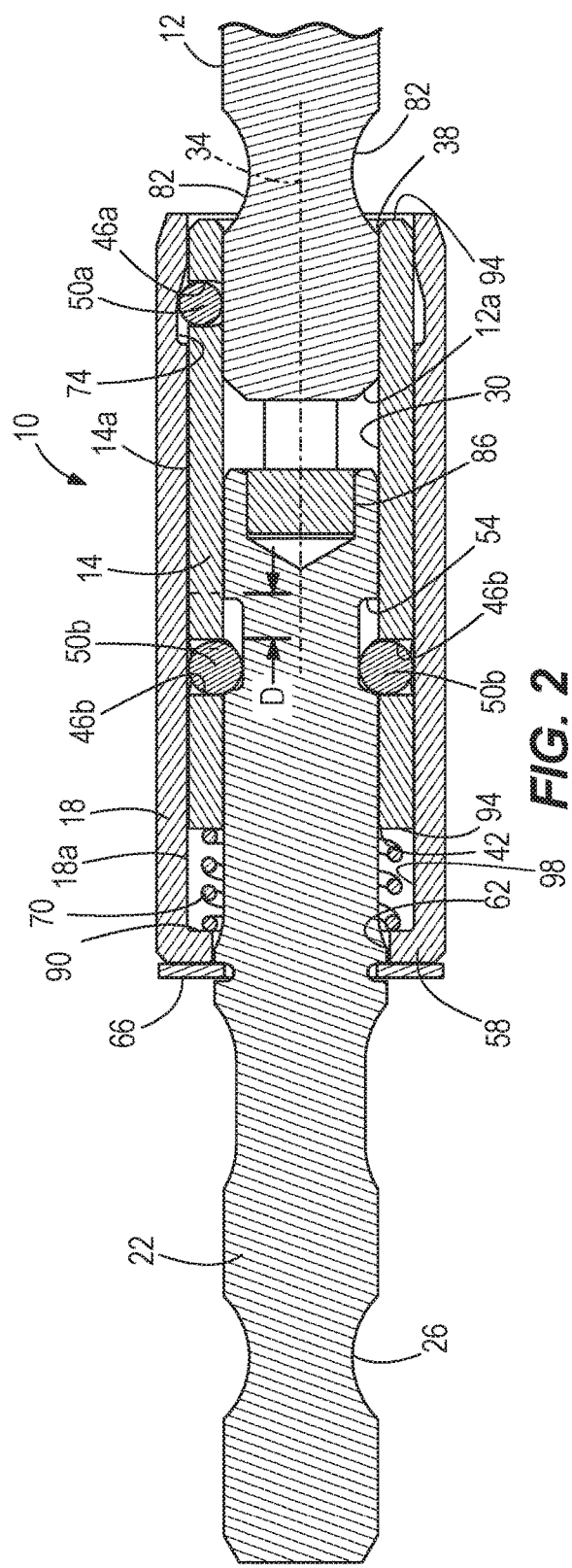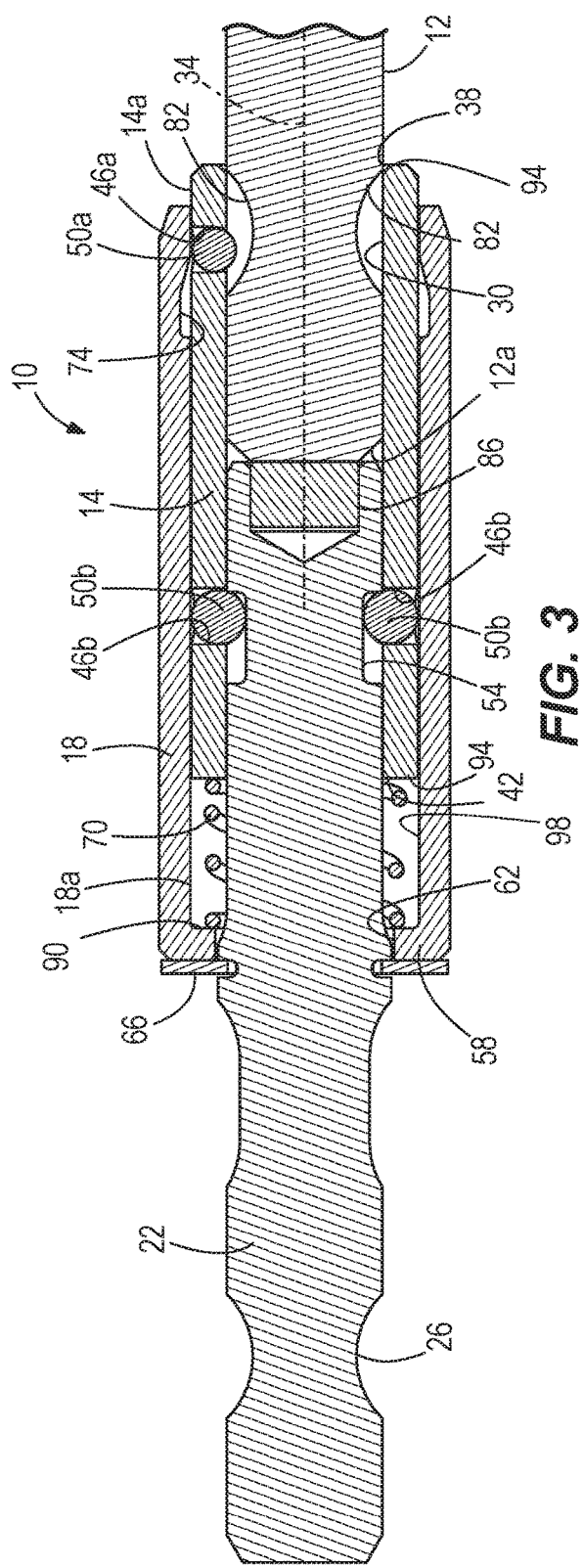

TOOL BIT HOLDER

FIELD OF THE INVENTION

The present invention relates to tool bit holders, more particularly to quick-release tool bit holders for use with rotary power tools.

BACKGROUND OF THE INVENTION

To facilitate tool bit changes during a work operation, rotary power tools often use quick-release bit holders in which different tool bits are receivable. Such bit holders axially secure tool bits therein by one or more ball detents, which when released permit removal of the tool bit from the bit holder.

SUMMARY OF THE INVENTION

The present invention provides, in one aspect, a tool bit holder including an inner sleeve in which a longitudinal bore is defined in which a tool bit is receivable, a detent engageable with the tool bit for locking the tool bit within the longitudinal bore, an outer sleeve surrounding the inner sleeve and movable relative to the inner sleeve between a locking position, in which the detent is engaged with the tool bit for locking the tool bit within the longitudinal bore, and a release position, in which the detent may be disengaged from the tool bit to permit removal of the tool bit from the longitudinal bore, and a spring positioned between the inner sleeve and the outer sleeve. The spring biases the outer sleeve toward the locking position The present invention provides, in another aspect, a tool bit holder including an inner sleeve in which a longitudinal bore is defined in which a tool bit is receivable, a shank received in the longitudinal bore of the inner sleeve, first and second radial bores each extending through the inner sleeve, between an outer periphery of the inner sleeve and the longitudinal bore, first and second detents received, respectively, in the first and second radial bores, the first detent being engageable with the tool bit for locking the tool bit within the longitudinal bore, an outer sleeve surrounding the inner sleeve and movable relative to the inner sleeve between a locking position, in which the first detent is engaged with the tool bit for locking the tool bit within the longitudinal bore, and a release position, in which the first detent may be disengaged from the tool bit to permit removal of the tool bit from the longitudinal bore, one of a circumferential groove or a notch in an outer periphery of the shank in which the second detent is received to limit axial displacement of the inner sleeve relative to the shank to a distance less than an axial length of the circumferential groove or notch, and a spring positioned between the inner sleeve and the outer sleeve. The spring biases the outer sleeve toward the locking position.

The present invention provides, in yet another aspect, a method of operating a tool bit holder. The method includes inserting a tool bit into a longitudinal bore of an inner sleeve until a rear of the tool bit abuts a detent positioned within a radial bore through the inner sleeve, sliding the inner sleeve in a rearward direction relative to an outer sleeve surrounding the inner sleeve, compressing a spring into a retracted position with the sliding inner sleeve while the outer sleeve remains stationary, pushing the ball detent with the rear of the tool bit radially outward into a channel in the outer sleeve, permitting continued insertion of the tool bit into the longitudinal bore, and releasing the spring in response to the ball detent disengaging the rear of the tool bit, permitting the spring to rebound to an extended position and push the inner sleeve in a forward direction toward a locked position in which the outer sleeve displaces the ball detent at least partially into the longitudinal bore to prevent removal of the tool bit therefrom.

Other aspects of the invention will become apparent by consideration of the detailed description and accompanying drawings.

BRIEF DESCRIPTION OF THE DRAWINGS

FIG. 2 is a cross-sectional view of the tool bit holder of FIG. 1, illustrating insertion of a tool bit.

FIG. 3 is a cross-sectional view of the tool bit holder of FIG. 1, illustrating the tool bit fully inserted in the tool bit holder

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
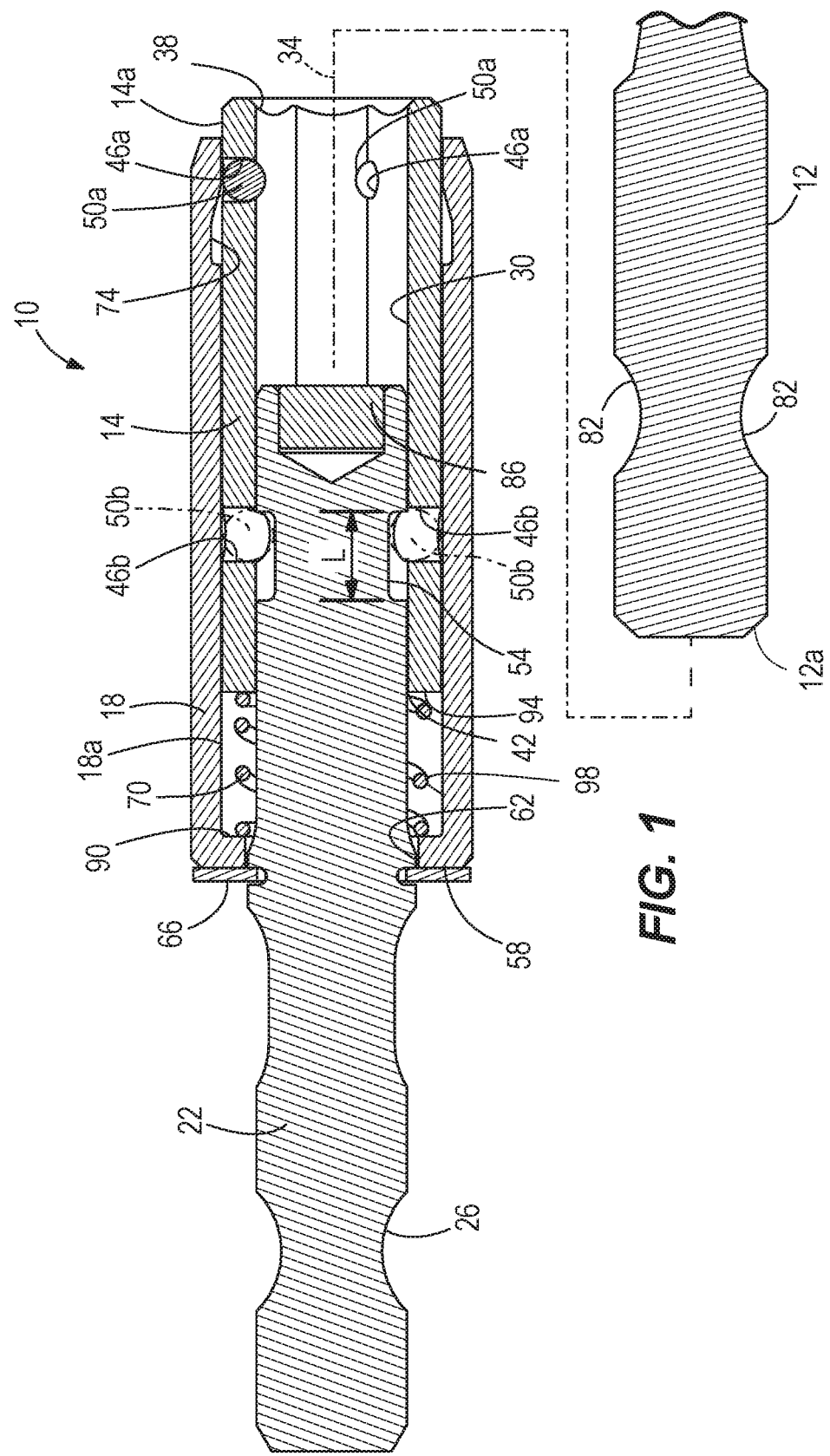
FIG. 1 is a cross-sectional view of a tool bit holder in accordance with an embodiment of the invention.
Figure 4:
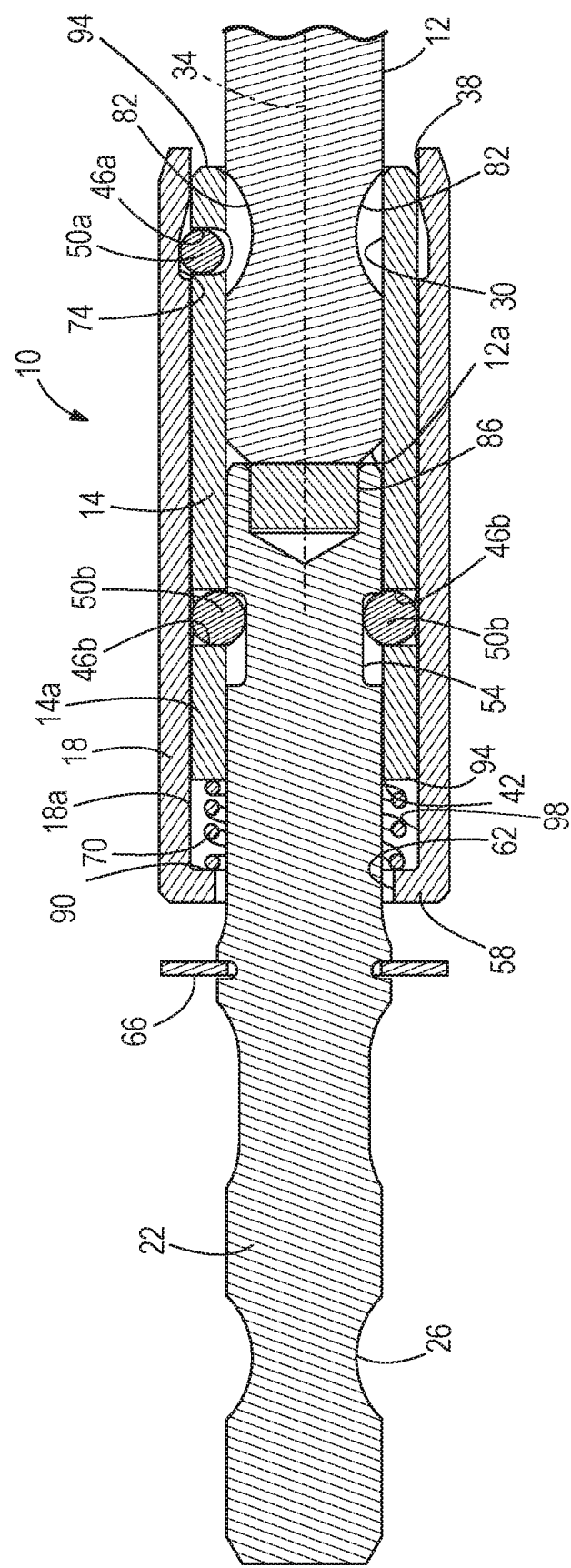
FIG. 4 is a cross-sectional view of the tool bit holder of FIG. 1, illustrating the tool bit being removed.

FIGS. 1 and 2 illustrate a tool bit holder 10 for adapting different types and sizes of tool bits 12 for use with a rotary power tool (e.g., drill driver, an impact driver, etc.). Such tool bits 12 are interchangeably coupled to the bit holder 10 without the use of tools. The bit holder 10 includes an inner sleeve 14, an outer sleeve 18 surrounding the inner sleeve 14 and slidable relative to the inner sleeve 14, and a shank 22 upon which both the inner sleeve 14 and the outer sleeve 18 are supported. The shank 22 includes a hexagonal cross-sectional shape and a circumferential groove 26 in which a ball detent of a quick-release mechanism of the rotary power tool is receivable for axially securing the bit holder 10 to the rotary power tool. Alternatively, the shank 22 may be clamped by multiple jaws of a drill chuck.

The inner sleeve 14 includes a longitudinal bore 30 defining a longitudinal axis 34 coaxial with the shank 22. The bore 30 includes a hexagonal cross-sectional shape corresponding to that of the shank 22, thereby providing a snug sliding fit between the inner sleeve 14 and the shank 22. The bore 30 also extends through the inner sleeve 14, defining opposite front and rear openings 38, 42. Tool bits 12 are receiveable through the front opening 38, whereas the shank 22 protrudes from the rear opening 42.

As previously stated, the inner sleeve 14 is slidable relative to the shank 22 along the longitudinal axis 34. The tool holder 10 also includes first and second pluralities of radial bores 46a, 46b spaced axially from each other along the axis 34, and first and second pluralities of ball detents 50a, 50b received in the radial bores 46a, 46b, respectively.

Figure 5:
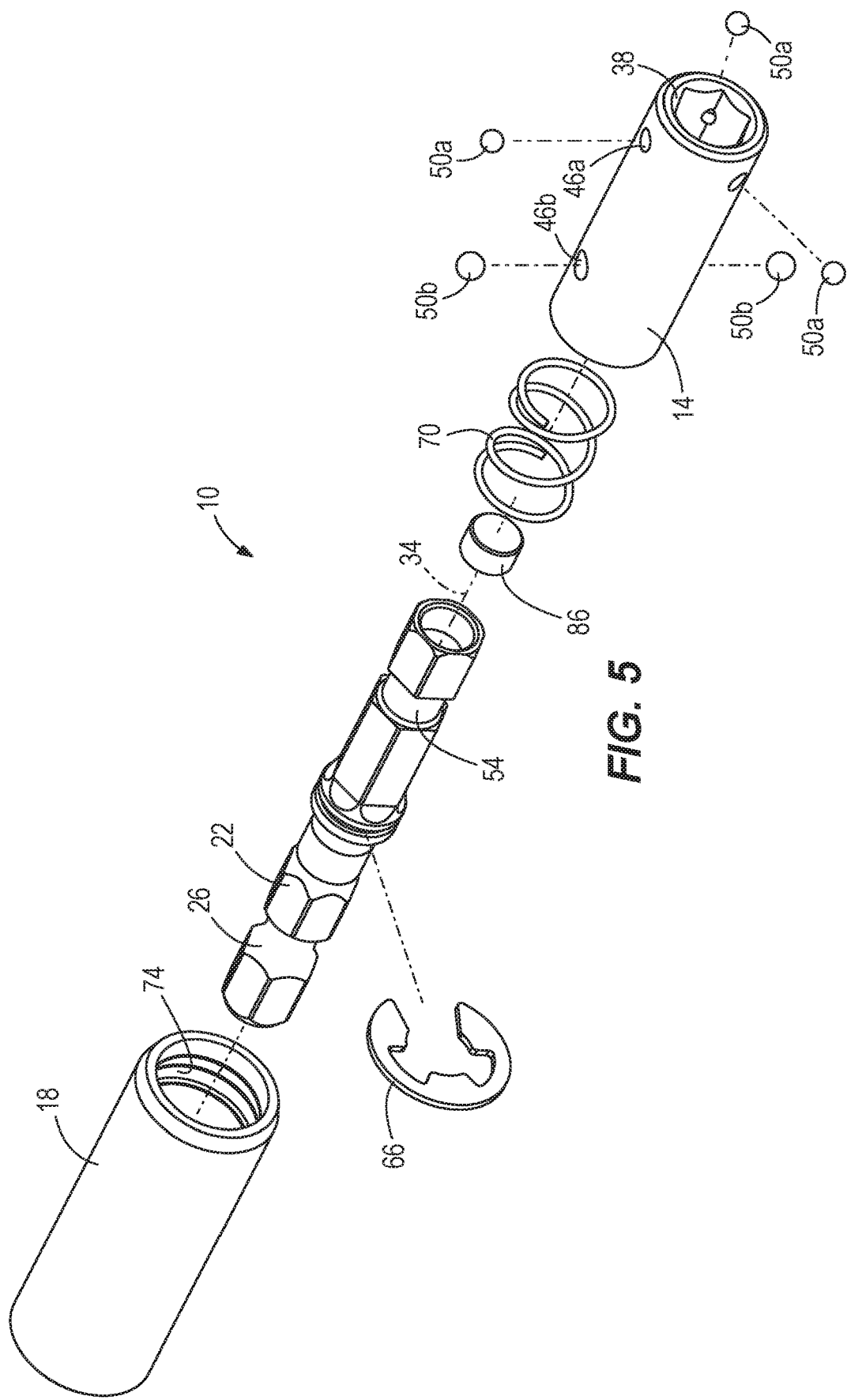
FIG. 5 is an exploded perspective view of the tool bit holder of FIG. 1.

The bores 46a, 46b extend radially through the inner sleeve 14, between a cylindrical outer periphery of the inner sleeve 14 and the bore 30. The radial bore 46a tapers in a radially inward direction, thereby defining openings into the bore 30 having a smaller diameter than the diameters of the respective ball detents 50a received in the bore 46a. Therefore, the ball detents 50a, 50b are prevented from falling into the bore 30. As shown in FIG. 5, the bores 46a are spaced approximately 120 degrees apart from each other. Alternatively, the bores 46a may be spaced approximately 180 degrees apart from each other.

Figure 6:
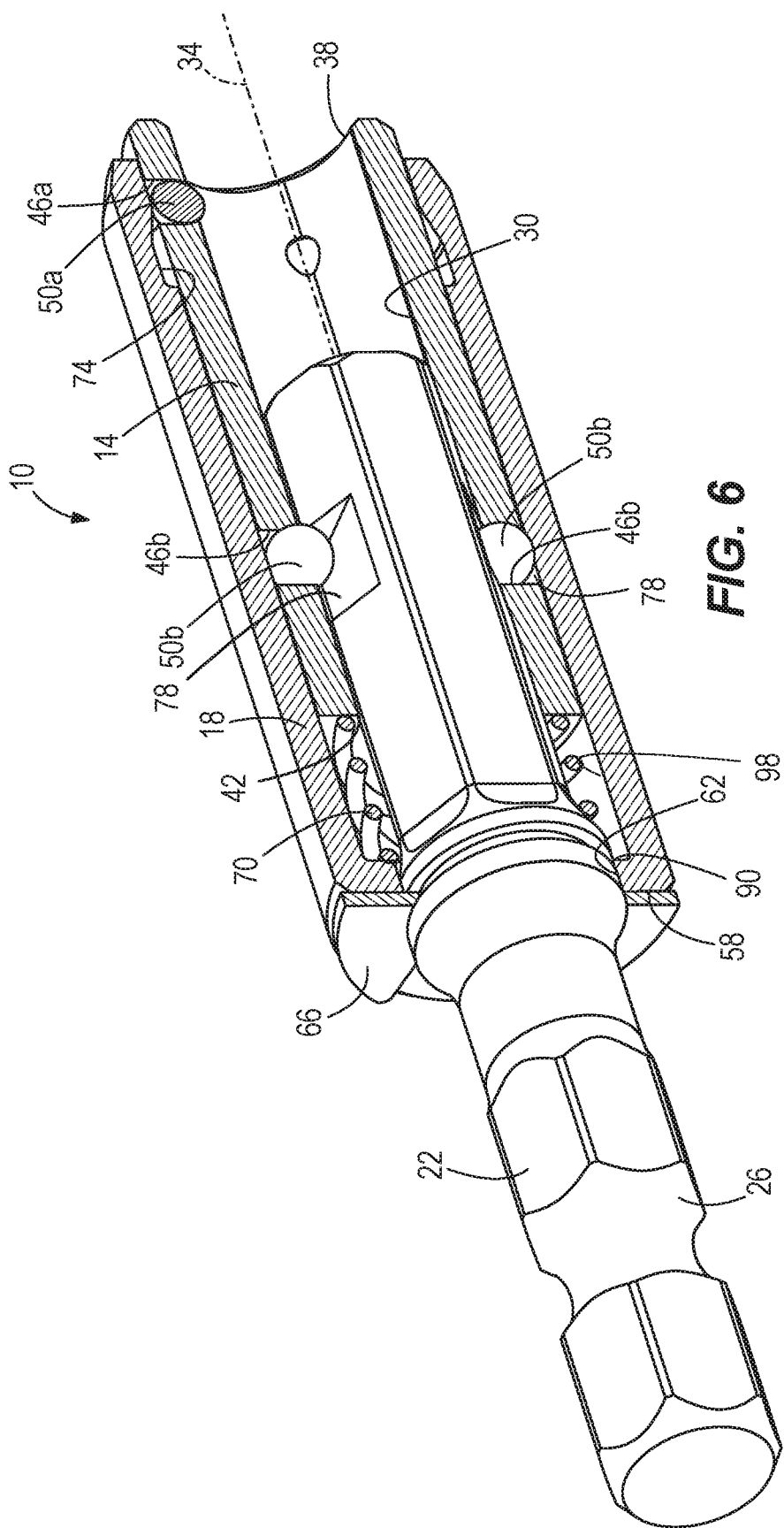
FIG. 6 is a perspective cutaway view of a tool bit holder in accordance with another embodiment of the invention.

In the illustrated embodiment of the tool bit holder 10, the bores 46b are spaced 180 degrees apart from each other for receipt of two of the ball detents 50b. Unlike the bores 46a, the bores 46b are cylindrical and have a diameter nominally greater than that of the ball detents 50b. Alternatively, only a single bore 46b and ball detent 50b may be used. As shown in FIGS. 1-4, the ball detents 50b are received within a circumferential groove 54 in the shank 22 having an axial length L. In an alternative embodiment of the tool bit holder 100 shown in FIG. 6, the ball detents 50b are received within corresponding, discrete notches 78 in the shank 22 rather than a circumferential groove 54.

With reference to FIGS. 1 and 2, the outer sleeve 18 includes a cylindrical inner periphery 18a corresponding to a cylindrical outer periphery 14a of the inner sleeve 14, thereby providing a snug sliding fit between the outer sleeve 18 and the inner sleeve 14. The outer sleeve 18 also includes a rear end 58 having a round aperture 62 through which the shank 22 extends. In alternative embodiments (not shown), the aperture 62 may be substantially hexagonal. The bit holder 10 further includes a retaining ring 66 secured to the shank 22 against which the rear end 58 of the outer sleeve 18 is abuttable and a spring 70 seated between an internal shoulder 90 defined by the rear end 58 of the outer sleeve 18 and a rear end 94 of the inner sleeve 14. The spring 70 also surrounds the shank 22. As such, the spring 70 is located within an annular chamber 98 defined by the shank 22, the cylindrical inner periphery 18a of the outer sleeve 18, the rear end 94 of the inner sleeve 14, and the shoulder 90 on the outer sleeve 18. Because the placement of the ball detents 50b in the circumferential groove 54 limits axial movement of the inner sleeve 14 relative to the shank 22 to a displacement D that is less than the axial length L of the groove 54, the spring 70 biases the rear end 58 of the outer sleeve 18 against the retaining ring 66 and the inner sleeve 14 and the outer sleeve 18 apart from each other.

The outer sleeve 18 also includes a channel 74 in the cylindrical inner periphery of the outer sleeve 18 proximate the radial bores 46a. When the channel 74 is misaligned with the ball detents 50a coinciding with a "locking" position of the outer sleeve 18 as shown in FIG. 1, the outer sleeve 18 displaces the ball detents 50a radially inward to protrude into the longitudinal bore 30 and clamp against a tool bit 12 to axially secure the tool bit 12 within the bore 30. In the illustrated embodiment, the ball detents 50a are biased radially inward to protrude into the bore 30 by the spring 70. The outer sleeve 18 is slidable relative to the inner sleeve 14 from its locking position to a "release" position (FIG. 2), against the bias of the spring 70, to align the channel 74 with the ball detents 50a. When aligned, the ball detents 50a are at least partially receiveable in the channel 74, and are also removed from the bore 30. Therefore, the clamping force applied to the tool bit 12 is released, permitting it to be removed from the bit holder 10.

In contrast, the ball detents 50b are continuously engaged with the cylindrical inner periphery 18a of the outer sleeve 18, regardless of its position. Therefore, the ball detents 50b are maintained within the circumferential groove 54 when the outer sleeve 18 is in the locking position and the release position.

FIG. 1 illustrates the tool bit holder 10 with the outer sleeve 18 in the locking position and without a tool bit 12 received in the holder 10. As stated above, when the outer sleeve 18 is in the locking position, the ball detents 50a radially protrude into the bore 30. Additionally, the spring 70 is situated within the chamber 98 in an extended position. Upon insertion of the tool bit 12 into the bore 30, a rear 12a of the tool bit 12 contacts the ball detents 50a. Because the ball detents 50a are misaligned with the channel 74, they cannot be radially displaced from the bore 30. Rather, continued rearward movement of the tool bit 12 causes the inner sleeve 14 to slide relative to the shank 22 while the outer sleeve 18 remains stationary in the locking position, compressing the spring 70 into a retracted position. After the inner sleeve 14 is displaced by the amount D, the ball detents 50a are pushed radially outward into the channel 74 of the outer sleeve 18, removing the ball detents 50a from the bore 30 and creating a sufficient amount of clearance for the tool bit 12 to be inserted past the ball detents 50a. Upon the ball detents 50a encountering a circumferential groove 82 in the tool bit 12, the spring 70 rebounds towards the extended position to push the inner sleeve 14 forward toward a locked position, driving the ball detents 50a into a wedged or clamped position between the cylindrical inner periphery 18a of the outer sleeve 18 and the tool bit 12. While the inner sleeve 14 is displaced forward, the outer sleeve 18 remains stationary in the locking position relative to the shank 22. Alternatively, the spring 70 may rebound to push the inner sleeve 14 forward by less than the displacement D, causing the ball detents 50a to wedge against a conical interior surface 74a (FIG. 1) transitioning the channel 74 to the cylindrical inner periphery 18a.

To release the bit 12, the outer sleeve 18 is pulled towards the front opening 38 against the bias of the spring 70 toward its release position, aligning the channel 74 in the outer sleeve 18 with the ball detents 50a, permitting radially outward movement of the ball detents 50a and removal of the tool bit 12. The illustrated embodiment of the holder 10 also includes a magnet 86 coupled to an end of the shank 22 within the bore 30 for retaining a tool bit 12 within the bore 30. Therefore, the magnet 86 may retain the tool bit 12 within the bore 30 even when the outer sleeve 18 is in the release position. In this manner, the tool bit 12 cannot fall out of the bore 30 once the outer sleeve 18 is moved to the release position. Rather, the user must grasp the tool bit 12 and pull it from the bore 30 for removal. Alternatively, the magnet 86 may be omitted from the holder 10.

Various features of the invention are set forth in the following claims.

What is claimed is:

1. A tool bit holder comprising:
   an inner sleeve in which a longitudinal bore is defined in which a tool bit is receivable;
   a shank received in the longitudinal bore of the inner sleeve;
   a first detent engageable with the tool bit for locking the tool bit within the longitudinal bore;
   a second detent received in a circumferential groove of the shank;
   an outer sleeve surrounding the inner sleeve and movable relative to the inner sleeve between a locking position, in which the first detent is engaged with the tool bit for locking the tool bit within the longitudinal bore, and a release position, in which the first detent may be disengaged from the tool bit to permit removal of the tool bit from the longitudinal bore, wherein the second detent is maintained in the circumferential groove in the locking position and the release position by the outer sleeve;

a spring positioned between the inner sleeve and the outer sleeve, wherein the spring biases the outer sleeve toward the locking position; and a magnet retaining the tool bit within the longitudinal bore.

2. The tool bit holder of claim 1, wherein the longitudinal bore includes a hexagonal cross-sectional shape, and wherein the shank includes a hexagonal outer periphery slidably received in the longitudinal bore along a longitudinal axis of the inner sleeve.

3. The tool bit holder of claim 1, wherein the second detent limits axial displacement of the inner sleeve relative to the shank.

4. The tool bit holder of claim 3, further comprising first and second radial bores each extending through the inner sleeve, between an outer periphery of the inner sleeve and the longitudinal bore, in which the first and second detents are received, respectively.

5. The tool bit holder of claim 1, wherein the circumferential groove is a notch.

6. The tool bit holder of claim 1, wherein the spring surrounds the shank.

7. The tool bit holder of claim 1, further comprising a retaining ring secured to the shank, wherein the outer sleeve is abuttable against the retaining ring to limit axial displacement of the outer sleeve relative to the shank.

8. The tool bit holder of claim 7, wherein the spring biases the outer sleeve against the retaining ring.

9. The tool bit holder of claim 1, further comprising a radial bore extending through the inner sleeve, between an outer periphery of the inner sleeve and the longitudinal bore, and wherein the first detent is received in the radial bore.

10. The tool bit holder of claim 9, wherein the radial bore tapers in a radial inward direction, defining an opening into the longitudinal bore having a smaller diameter than the diameter of the first detent.

11. The tool bit holder of claim 10, wherein the outer sleeve includes a circumferential channel in a cylindrical interior periphery thereof in which the first detent is receivable in the release position of the outer sleeve.

12. The tool bit holder of claim 11, wherein the outer sleeve includes a conical interior surface extending between the circumferential channel and the cylindrical interior periphery of the outer sleeve, and wherein in the locking position of the outer sleeve, the first detent is engageable with the conical interior surface of the outer sleeve or the cylindrical interior periphery of the outer sleeve.

13. The tool bit holder of claim 11, wherein when the outer sleeve is in the locking position, the first detent is engaged with the cylindrical interior periphery of the outer sleeve and radially displaced inward to protrude into the longitudinal bore.

14. The tool bit holder of claim 13, wherein insertion of the tool bit into the longitudinal bore axially displaces the inner sleeve relative to the outer sleeve against the bias of the spring.

15. The tool bit holder of claim 14, wherein the inner sleeve is axially displaceable relative to the shank in response to insertion of the tool bit into the longitudinal bore by an axial distance that is less than the axial length of the circumferential groove.

16. The tool bit holder of claim 15, wherein the first detent is receivable in the channel following axial displacement of the inner sleeve by the axial distance that is less than the axial length of the circumferential groove.

17. The tool bit holder of claim 1, further comprising a shank received in the longitudinal bore of the inner sleeve, wherein the magnet is coupled to an end of the shank within the longitudinal bore.

18. A method of operating a tool bit holder, the method comprising:

inserting a tool bit into a longitudinal bore of an inner sleeve until a rear of the tool bit abuts a first detent positioned within a radial bore through the inner sleeve;

sliding the inner sleeve in a rearward direction relative to an outer sleeve surrounding the inner sleeve, thereby pushing a second detent in the rearward direction along a circumferential groove of a shank;

compressing a spring into a retracted position with the sliding inner sleeve while the outer sleeve remains stationary;

pushing the first detent with the rear of the tool bit radially outward into a channel in the outer sleeve, permitting continued insertion of the tool bit into the longitudinal bore;

releasing the spring in response to the first detent disengaging the rear of the tool bit, permitting the spring to rebound to an extended position and push the inner sleeve in a forward direction toward a locked position in which the outer sleeve displaces the first detent at least partially into the longitudinal bore to prevent removal of the tool bit therefrom and pushing the second detent in the forward direction along the circumferential groove of the shank; and retaining the rear of the tool bit against the shank of the tool bit holder with a magnet coupled to the shank.

19. The method of claim 18, further comprising:

pulling the outer sleeve in a forward direction towards an opening of the longitudinal bore, with the inner sleeve remaining stationary, against the bias of the spring;

aligning the channel in the outer sleeve with the first detent; and removing tool bit from the longitudinal bore, thereby pushing the first detent radially outward into the channel and out of the longitudinal bore.

20. A tool bit holder comprising:

an inner sleeve in which a longitudinal bore is defined in which a tool bit is receivable;

a shank received in the longitudinal bore of the inner sleeve;

a first detent engageable with the tool bit for locking the tool bit within the longitudinal bore;

a second detent received in a circumferential groove of the shank;

an outer sleeve surrounding the inner sleeve and movable relative to the inner sleeve between a locking position, in which the first detent is engaged with the tool bit for locking the tool bit within the longitudinal bore, and a release position, in which the first detent may be disengaged from the tool bit to permit removal of the tool bit from the longitudinal bore, wherein the second detent is maintained in the circumferential groove in the locking position and the release position by the outer sleeve;

a spring positioned between the inner sleeve and the outer sleeve, wherein the spring biases the outer sleeve toward the locking position; and a retaining ring secured to the shank, wherein the outer sleeve is abuttable against the retaining ring to limit axial displacement of the outer sleeve relative to the shank.

21. A method of operating a tool bit holder, the method comprising:
- inserting a tool bit into a longitudinal bore of an inner sleeve until a rear of the tool bit abuts a first detent positioned within a radial bore through the inner sleeve;
- sliding the inner sleeve in a rearward direction relative to an outer sleeve surrounding the inner sleeve, thereby pushing a second detent in the rearward direction along a circumferential groove of a shank;
- compressing a spring into a retracted position with the sliding inner sleeve while the outer sleeve remains stationary;
- pushing the first detent with the rear of the tool bit radially outward into a channel in the outer sleeve, permitting continued insertion of the tool bit into the longitudinal bore;
- releasing the spring in response to the first detent disengaging the rear of the tool bit, permitting the spring to rebound to an extended position and push the inner sleeve in a forward direction toward a locked position in which the outer sleeve displaces the first detent at least partially into the longitudinal bore to prevent removal of the tool bit therefrom and pushing the second detent in the forward direction along the circumferential groove of the shank;
- pulling the outer sleeve in a forward direction towards an opening of the longitudinal bore, with the inner sleeve remaining stationary, against the bias of the spring;
- aligning the channel in the outer sleeve with the first detent; and
- removing tool bit from the longitudinal bore, thereby pushing the first detent radially outward into the channel and out of the longitudinal bore.

* * * * *